United States Patent Office 3,510,517
Patented May 5, 1970

3,510,517

2-DIMETHYLAMINO-5-CHLORO-BENZHYDROLS

Sidney B. Richter and David P. Mayer, Chicago, Ill., assignors to Velsicol Chemical Corporation, Chicago, Ill., a corporation of Illinois No Drawing. Continuation-in-part of application Ser. No. 454,688, May 10, 1965. This application May 12, 1967, Ser. No. 637,934
Int. Cl. C07c *91/40*
U.S. Cl. 260—570 7 Claims

ABSTRACT OF THE DISCLOSURE

A new compound of the formula

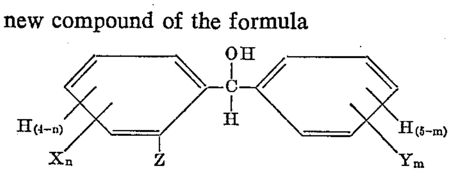

wherein Z is dialkylamino; each X and Y is independently selected from the group consisting of alkyl, alkenyl, halogen, nitro, alkoxy, dialkylamino and alkylthio; *n* is an integer from 0 to 4; and *m* is an integer from 0 to 5. An acaricidal composition comprising an inert carrier and, in a quantity toxic to acarids, a compound of the above formula. A fungicidal composition comprising an inert carrier and, in a quantity toxic to fungi, a compound of the above formula.

This application is a continuation in part of our copending application Ser. No. 454,688, filed May 10, 1965, and now U.S. Pat. No. 3,340,294.

This invention relates to new chemical compositions of matter. More particularly, this invention relates to new chemical compositions of the formula

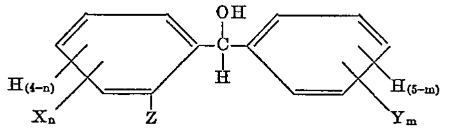

wherein Z is dialkylamino; each X and Y is independently selected from the group consisting of alkyl, alkenyl, halogen, nitro, alkoxy, dialkylamino and alkylthio; *n* is an integer from 0 to 4; and *m* is an integer from 0 to 5.

In a preferred embodiment of this invention Z is di(lower alkyl)amino; each X and Y is independently selected from the group consisting of lower alkyl, lower alkenyl, halogen, nitro, lower alkoxy, di(lower alkyl)-amino and lower alkylthio; *n* is an integer from 0 to 2 and *m* is an integer from 1 to 3.

Unexpectedly the compounds of the present invention are effective as acaricides and fungicides.

Exemplary of the compounds of the present invention are:

2-dimethylamino-3'-chlorobenzhydrol,
2-dimethylamino-2',5-dichlorobenzhydrol,
2-dimethylamino-5-chloro-4'-methylbenzhydrol,
2-dimethylamino-5-chloro-3'-methylbenzhydrol,
2-dimethylamino-4',5-dichlorobenzhydrol,
2-dimethylamino-3',5-dichlorobenzhydrol,
2-dimethylamino-5-chloro-2'-methylbenzhydrol,
2-dimethylamino-5-chloro-3',4'-dimethylbenzhydrol,
2-dimethylamino-5,5'-dichloro-4'-methylbenzhydrol,
2,4'-bis-(dimethylamino)-benzhydrol,
2-dimethylamino-2'-chloro-4'-methylbenzhydrol,
2-dimethylamino-3'-bromobenzhydrol,
2-dimethylamino-3',5'-dibromobenzhydrol,
2-dimethylamino-4',5-dimethylbenzhydrol, 2-dimethylamino-5-chloro-4'-nitrobenzhydrol,
2-dimethylamino-4'-allylbenzhydrol,
2-dimethylamino-4'-methoxybenzhydrol,
2-dimethylamino-4'-methylthiobenzhydrol,
2-dimethylamino-5-nitro-4'-chlorobenzhydrol,
2-dimethylamino-5-methoxy-4'-methylbenzhydrol,
2-dimethylamino-5-chloro-2',4'-dimethoxybenzhydrol,
2-dimethylamino-5-methoxy-4'-methylbenzhydrol,
2-diethylamino-5-chloro-4-methylbenzhydrol,
2-dipropylamino-4'-chlorobenzhydrol,
2-dipropylamino-5-chloro-4'-methylbenzhydrol,
2-diethylamino-5-chloro-3'-methylbenzhydrol,
2-diethylamino-4',5-dichlorobenzhydrol,
2-diethylamino-5-chloro-4'-methoxybenzhydrol,
2-diethylamino-4',5-dibromobenzhydrol, and the like.

These compounds can be prepared readily by several methods from the corresponding dialkylaminobenzophenone, for example by reduction with lithium aluminum hydride. The dialkylaminobenzophenone can be prepared from the corresponding aminobenzophenone by alkylation procedures known to the art, such as treatment with dimethyl sulfate, formic acid and formaldehyde, alkyl halides or alkenyl halides, and combinations thereof. In some cases the dialkylaminobenzophenone can be prepared from the corresponding halobenzophenone by reaction with dialkylamines, such as N-methyl-N-ethylamine,
N-methyl-N-isopropylamine,
N-methyl-N-n-propylamine,
N-methyl-N-n-butylamine,
N-methyl-N-sec-butylamine,
N-methyl-N-amylamine,
N-ethyl-N-n-propylamine,
N-ethyl-N-isopropylamine.

Exemplary of various of these starting materials are:
2-bromobenzophenone, 2,2'-dibromobenzophenone,
2,4-dibromobenzophenone,
2,6-dibromobenzophenone,
2-bromo-5-chlorobenzophenone,
2-bromo-3'-chlorobenzophenone,
2-bromo-3',5-dichlorobenzophenone,
2-bromo-4-methylbenzophenone,
2-amino-4'-bromobenzophenone,
2-amino-5',4-dimethylamino-2'-chlorobenzophenone,
2-amino-5'-bromobenzophenone,
2-amino-5'-chlorobenzophenone,
4-amino-2'-chlorobenzophenone,
2-amino-5-chloro-4'-methoxybenzophenone,
2'-amino-3-chloro-4-methylbenzophenone,
4-amino-2-chloro-2'-methylbenzophenone,
2-amino-4,5-dichlorobenzophenone,
2-amino-2',4-dimethoxybenzophenone, and the like.

The benzophenones can be readily prepared by the Friedel-Crafts reaction of a suitably substituted benzoyl chloride with aniline or a suitably substituted aniline. This reaction, well known in the art, can be carried out, for example, by heating a substituted benzoyl chloride to about 120° C., adding a substituted aniline, heating the reaction mixture to about 180° C., adding zinc chloride and reacting the mixture at about 220° C. for a period of about ½ to about 2 hours. The product can be dissolved in an organic solvent, washed with an inorganic base, dried and recovered by stripping off the solvent to yield the desired benzophenone.

Exemplary of suitable anilines are 4-chloroaniline, 4-bromoaniline, 4-methylaniline, 3-chloroaniline, 4-methoxyaniline, 4 - methylthioaniline, 4 - nitroaniline, 4 - allyl-aniline, 3,5 - dichloroaniline, 3 - methylaniline, 2,4 - dichloroaniline and the like.

Exemplary of suitable benzoyl chlorides are 2-methylbenzoyl chloride, 4 - chlorobenzoyl chloride, 4 - methoxybenzoyl chloride, 3 - methoxy - 4 - methylbenzoyl chloride, 3,4 - dimethylbenzoyl chloride, 4 - methylbenzoyl chloride, 2 - chlorobenzoyl chloride, 4 - nitrobenzoyl chloride, 2-allylbenzoyl chloride and the like.

The manner in which the new compounds of the present invention can be prepared readily is illustrated in the following examples:

EXAMPLE 1

Preparation of 2-dimethylamino-5-chloro-4'-methylbenzophenone

Para-methylbenzoyl chloride (33.3 gms.) was heated, with stirring, to about 120° C. in a glass reaction flask equipped with mechanical stirrer, internal thermometer and reflux condenser. Para-chloroaniline (12.8 gms.) was added to the reaction flask and the mixture heated to about 180° C. Dry zinc chloride (17.4 gms.) was added and the reaction mixture heated to a temperature of from about 220 to about 240 degrees C. for a period of about 2 hours. After this time the reaction mixture was cooled to about 120° C. A mixture of glacial acetic acid (40 ml.) and hydrogen bromide (40 ml.; assay 48%) was added and refluxed overnight. After this time the reaction mixture was concentrated under reduced pressure by removing excess solvent. The residue was refluxed for about 40 minutes in sulfuric acid (64 ml.; 75% v./v.) and poured into crushed ice. The resulting mixture was extracted with ether. The ether extract was first washed with sodium hydroxide (100 ml.; 3 N) and then washed with water. The extract was dried over magnesium sulfate, filtered and evaporated. The residue was distilled to yield 2-amino-5-chloro-4'-methylbenzophenone.

2 - amino - 5 - chloro - 4' - methylbenzophenone (8.4 gms.), formic acid (23 ml.) and formaldehyde (15 ml.; assay 38%) were charged into a 250 ml. glass reaction flask equipped with mechanical stirrer, reflux condenser and internal thermometer. The reaction mixture was refluxed for a period of about 17 hours. After this time the mixture was diluted with water (200 ml.) and extracted two times with ether. The two ether extracts were combined, washed first with aqueous sodium hydroxide (100 ml.; 3 N) and then with water. The washed extract was dried over magnesium sulfate, filtered and evaporated. The residue was distilled to yield 2-dimethylamino-5-chloro-4'-methylbenzophenone as a yellow liquid having a boiling point of 136 to 141 degrees C. at 0.02 mm. Hg pressure.

EXAMPLE 2

Preparation of 2-dimethylamino-5-chloro-4'-methylbenzhydrol

A solution of lithium aluminum hydride (1.5 gms.) in ether (100 ml.) was charged, with stirring, into a 250 ml. glass reaction flask equipped with mechanical stirrer, internal thermometer and reflux condenser. A solution of 2 - dimethylamino - 5 - chloro - 4' - methylbenzophenone (7.0 gms.) in ether (100 ml.) was then slowly added to the flask over a period of 15 minutes. The reaction mixture was then heated at reflux, with continuous stirring, for a period of about 6 hours. The reaction mixture was cooled to room temperature. A solution of sodium potassium tartrate (1.5 grams) dissolved in water (6 ml.) was added dropwise with stirring, to the cooled reaction mixture. The resulting mixture was filtered and the filter cake washed with ether. The filtrate was dried and evaporated to yield a liquid as the residue. The residue was distilled under vacuum to yield 2-dimethylamino-5-chloro-4'-methylbenzhydrol having a boiling point of 137 to 142° C. at 0.05 mm. Hg pressure and having the following elemental analysis:

*Analysis.*—Theoretical for $C_{16}H_{18}ClNO$ (percent): C, 69.68; H, 6.58; Cl, 12.86. Found (percent): C, 69.22; H, 6.60; Cl, 13.05.

EXAMPLE 3

Preparation of 2-dimethylamino-5-chloro-3'-methylbenzophenone

Para-methylbenzoyl chloride (30 gms.) was heated, with stirring, to about 120° C. in a 250 ml. glass reaction flask equipped with mechanical stirrer, internal thermometer and reflux condenser. Para-chloraniline (12 gms.) was then slowly added to the reaction flask and the mixture heated to about 180° C. Dry zinc chloride (17 grams) was added and the reaction mixture was heated to a temperature of from about 220 to about 230° C. for a period of about 2 hours. After this time the reaction mixture was cooled to about 120° C. A mixture of concentrated hydrochloric acid (35 ml.) and concentrated acetic acid (35 ml.) was added and refluxed for about 17 hours. After this time the mixture was concentrated under reduced pressure and the residue poured over crushed ice. The resulting mixture was extracted with ether. The ether extract was first washed with aqueous sodium hydroxide (100 ml.; 3 N) and then with water. The extract was dried over magnesium sulfate, filtered and evaporated under reduced pressure. The residue was vacuum distilled to yield 2-amino-5-chloro-3'-methylbenzophenone as a viscous yellow liquid having a boiling point of 145 to 150° C. at 0.02 mm. Hg pressure.

2 - amino - 5 - chloro - 3' - methylbenzophenone (8 grams), formic acid (23 ml.) and formaldehyde (15 ml.; 38%) were charged into a 250 ml. glass reaction flask equipped with mechanical stirrer, internal thermometer and reflux condenser. The reaction mixture was heated at reflux with stirring for a period of about 17 hours. After this time the mixture was diluted with water (200 ml.), and extracted twice with ether. The ether extracts were combined, first washed with aqueous sodium hydroxide (100 ml.; 3 N) and with water. The extract was then dried over magnesium sulfate, filtered, and evaporated on a steam bath. The residue was vacuum distilled to yield 2-dimethylamino-5-chloro-3'-methylbenzophenone as a viscous yellow liquid having a boiling point of 130 to 135° C. at 0.02 mm. Hg pressure.

EXAMPLE 4

Preparation of 2-dimethylamino-5-chloro-3'-methylbenzhydrol

A solution of lithium aluminum hydride (1.5 gms.) in ether (100 ml.) was charged, with stirring, into a 250 ml. glass reaction flask equipped with mechanical stirrer, internal thermometer and reflux condenser. A solution of 2-dimethylamino - 5 - chloro-3'-methylbenzophenone (7.0 gms.) in ether (100 ml.) was then slowly added to the flask over a period of 15 minutes. The reaction mixture was then heated at reflux for a period of about 6½ hours. The reaction mixture was cooled to room temperature. A solution of sodium potassium tartrate (1.5 gm.) in water (6 ml.) was added dropwise with stirring to the cooled reaction mixture. The resulting mixture was filtered and the filter cake washed with ether. The filtrate was dried and evaporated to yield a liquid as the residue. The residue was distilled under vacuum to yield 2-dimethylamino-5-chloro-3'-methylbenzhydrol having a boiling point of 132 to 136° C. at 0.02 mm. Hg pressure and having the following elemental analysis:

*Analysis.*—Theoretical for $C_{16}H_{18}ClNO$ (percent): C, 69.68; H, 6.58; Cl, 12.86. Found (percent): C, 70.18; H, 6.68; Cl, 13.80.

EXAMPLE 5

Preparation of 2-dimethylamino-4',5-dichlorobenzophenone 2-amino-4',5-dichlorobenzophenone (8 gms.), formic acid (23 ml.), and formaldehyde (15 ml.; 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two ether extracts were combined, washed first with aqueous sodium hydroxide (100 ml.; 3 N) and then with water. The extract was dried over magnesium sulfate, filtered, and evaporated on a steam bath. The residue was vacuum distilled to yield 2-dimethylamino-4′,5-dichlorobenzophenone as a yellow liquid having a boiling point of 140 to 145° C. at 0.05 mm. Hg pressure.

EXAMPLE 6

Preparation of 2-dimethylamino-4′,5-dichlorobenzhydrol

A solution of lithium aluminum hydride (1.5 gms.) in ether (100 ml.) was charged, with stirring, into a 250 ml. glass reaction flask equipped with mechanical stirrer, internal thermometer and reflux condenser. A solution of 2-dimethylamino-4′,5-dichlorobenzophenone (7.1 gms.) in ether (100 ml.) was then slowly added to the flask over a period of 15 minutes. The reaction mixture was heated at reflux for a period of about 6½ hours. The reaction mixture was cooled to room temperature. A solution of sodium potassium tartrate (1.5 grams) in water (6 ml.) was added dropwise with stirring, to the cooled reaction mixture. The resulting mixture was filtered and the filter cake washed with ether. The filtrate was dried and evaporated to yield a liquid as the residue. The residue was distilled under vacuum to yield 2-dimethylamino-4′,5-dichlorobenzhydrol having a boiling point of 150 to 155° C. at 0.02 mm. Hg pressure and having the following elemental analysis:

*Analysis.*—Theoretical for $C_{15}H_{15}Cl_2NO$ (percent): C, 60.82; H, 5.10; Cl, 23.94. Found (percent): C, 61.13; H, 5.16; Cl, 23.97.

EXAMPLE 7

Preparation of 2-dimethylamino-3′,5-dichlorobenzophenone 2-amino-3′,5-dichlorobenzophenone (8 gms.), formic acid (23 ml.) and formaldehyde (15 ml.; assay 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two ether extracts were combined, washed first with aqueous sodium hydroxide (100 ml.; 3 N), and then with water. The extract was dried over magnesium sulfate, filtered and evaporated on a steam bath. The residue was vacuum distilled to yield 2-dimethylamino-3′,5-dichlorobenzophenone as a yellow liquid having a boiling point of 130 to 135° C. at 0.02 mm. Hg pressure.

EXAMPLE 8

Preparation of 2-dimethylamino-3′,5-dichlorobenzhydrol

A solution of lithium aluminum hydride (2.0 gms.) in ether (100 ml.) was charged, with stirring, into a 250 ml. glass reaction flask equipped with mechanical stirrer, internal thermometer and reflux condenser. A solution of 2-dimethylamino-3′,5-dichlorobenzophenone (11.7 gms.) in ether (150 ml.) was then slowly added to the flask over a period of about 15 minutes. The reaction mixture was heated at reflux for a period of about 17 hours. The reaction mixture was cooled to room temperature. A solution of sodium potassium tartrate (2.0 grams) in water (8 ml.) was added dropwise with stirring, to the cooled reaction mixture. The resulting mixture was filtered and the filter cake washed with ether. The filtrate was dried and evaporated to yield a liquid as the residue. The residue was distilled under vacuum to yield 2-dimethylamino-3′,5-dichlorobenzhydrol having a boiling point of 144 to 148° C. at 0.02 mm. Hg pressure and having the following elemental analysis.

*Analysis.*—Theoretical for $C_{15}H_{15}Cl_2NO$ (percent): C, 60.82; H, 5.10; Cl, 23.94. Found (percent): C, 61.23; H, 5.12; Cl, 23.92.

EXAMPLE 9

Preparation of 2-dimethylamino-5-chloro-2′-methylbenzophenone

Para-methylbenzoyl chloride (17.4 gms.) was heated, with stirring, to about 120° C. in a 250 ml. glass reaction flask equipped with mechanical stirrer, internal thermometer and reflux condenser. Para-chloroaniline (6.4 grams) was then slowly added to the reaction flask and the mixture heated to about 180° C. Dry zinc chloride (6.4 grams) was added and the reaction mixture was heated to a temperature of from about 225 to about 230° C. for a period of about 2 hours. After this time the reaction mixture was cooled to about 120° C. A mixture of glacial acetic acid (40 ml.) and hydrogen bromide (40 ml.; assay 48%) was added, and refluxed for a period of about 17 hours. After this time the reaction mixture was concentrated under reduced pressure and hydrochloric acid (20 ml.; 3 N) was added. The mixture was heated to boiling and was decanted. The residue was heated to reflux for about 40 minutes in sulfuric acid (32 ml., 75% v./v.) and poured over ice. The resulting mixture was extracted twice with ether. The ether extracts were combined and washed with 3 N hydrochloric acid, 5 N sodium hydroxide and with water. The extract was dried over magnesium sulfate, filtered and evaporated to yield a red viscous oil. The oil was distilled to yield 2-amino-5-chloro-2′-methylbenzophenone having a boiling point of 130 to 140° C. at 0.02 mm. Hg pressure.

2-amino-5-chloro-2′-methylbenzophenone (8 gms.), prepared above, and trimethylphosphate (12 gms.) were charged into a 250 ml. glass reaction flask equipped with stirrer, thermometer and reflux condenser. The reaction mixture was heated with stirring at about 160° C. for a period of about 2½ hours. After this time the reaction mixture was cooled to 120° C. and a solution of sodium hydroxide (10 gms.) in water (75 ml.) was added. The reaction mixture was then refluxed for about 1½ hours and let stand at room temperature over night. The reaction mixture was then extracted with ether, the ether extract dried over magnesium sulphate, filtered and evaporated. The residue was vacuum distilled to yield 2-dimethylamino-5-chloro-2′-methylbenzophenone as a yellow liquid.

EXAMPLE 10

Preparation of 2-dimethylamino-5-chloro-2′-methylbenzhydrol

A solution of lithium aluminum hydride (1.5 gms.) in ether (100 ml.) was charged, with stirring into a 250 ml. glass reaction flask equipped with mechanical stirrer, internal thermometer and reflux condenser. A solution of 2-dimethylamino-5-chloro-2′-methylbenzophenone (5.9 gms.) in ether (100 ml.) was then slowly added to the flask over a period of 15 minutes. The reaction mixture was then heated at reflux for a period of about 3½ hours. The reaction mixture was cooled to room temperature. A solution of sodium potassium tartrate (1.5 gms.) in water (6.0 ml.) was added, with stirring, dropwise to the cooled reaction mixture. The resulting mixture was allowed to stand at room temperature overnight. The mixture was then distilled under reduced pressure to yield 2-dimethylamino-5-chloro-2′-methylbenzhydrol having a boiling point of 143 to 152° C. at 0.15 mm. Hg pressure, and having an elemental analysis as follows:

*Analysis.*—Theoretical for $C_{16}H_{28}ClNO$ (percent): C, 69.68; H, 6.58; Cl, 12.86. Found (percent): C, 70.18; H, 6.85; Cl, 12.32.

The compounds of the present invention can be used to effectively control acarids, particularly mites and ticks. Many economically important species of mites and ticks are known, including the two spotted spider mite, the red spider mite, the strawberry spider mite, the citrus rust mite, the citrus red mite, the European red mite, the cattle tick, and the poultry mite. Chemicals useful for the control of mites are often called miticides, while those useful for the control of both mites and ticks are known specifically as acaricides.

For practical use as acaricides, the compounds of this invention are generally incorporated into acaricidal compositions which comprise an inert carrier and an acaricidally toxic amount of such a compound. Such acaricidal compositions, which can also be called formulattions, enable the active compound to be applied conveniently to the site of the acarid infestation in any desired quantity. These compositions can be solids such as dusts, granules, or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 11

Preparation of a dust

| | |
|---|---|
| Product of Example 2 | 10 |
| Powdered talc | 90 |

The above ingredients are mixed in a mechanical grinder-blender and are ground until a homogenous, free-flowing dust of the desired particle size is obtained. This dust is suitable for direct application to the site of the acarid infestation.

The compounds of this invention can be applied as acaricides in any manner recognized by the art. One method for destroying acarids comprises applying to the locus of the acarid infestation an acaricidal composition comprising an inert carrier, and as the essential active ingredient, in a quantity which is toxic to said acarids, a compound of the present invention. The concentration of the new compounds of this invention in the acaricidal compositions will vary greatly with the type of formulation and the purpose for which it is designed, but generally the acaricidal compositions will comprise from about 0.05 to about 95 percent by weight of the active compounds of this invention. In a preferred embodiment of this invention, the acaricidal compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with insecticides in the compositions heretofore described. These insecticides can comprise from about 5% to about 95% of the active ingredients in the compositions. Use of the combinations of these insecticides with the compounds of the present invention provide acaricidal and insecticidal compositions which are effective in controlling acarids and insects and often provide results unattainable with separate compositions of the individual components. The insecticides with which the compounds of this invention can be used in the compositions to control insects, can include halogenated compounds such as DDT, methoxychlor, TDE, lindane, chlordane, isobenzan, aldrin, dieldrin, heptachlor, endrin, mirex, endosulfon, dicofol, chlorobenzilate and the like; organic phosphorus compounds such as TEPP, schradan, ethion, Parathion, Methyl Parathion, EPN, demeton, carbophenothion, phorate, Zinophos, Diazinon, malathion, mevinphos, dimethoate, DBD, ronnel, oxydemeton-methyl, dicapthon, chlorothion, phosphamidon, naled, fenthion, trichlorfon, DDVP, and the like; organic nitrogen compounds such as dinitro-o-cresol, dinitro-cyclohexylphenol, DNB, DNP, azobenzene, binapacryl and the like; organic carbamate compounds such as carbaryl, ortho 5353 and the like; organic sulfur compounds such as phenothiazine, phenoxathin, lauryl thiocyanate, bis(2-thiocyanoethyl)-ether, isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, para-dichlorobenzene, and the like.

The new compounds of this invention can be used in many ways for the control of acarids, for example, by spraying on plants on which the acarids feed. The quantity of active compounds of this invention to be used acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The utility of the compounds of the present invention as acaricides was illustrated in experiments for the control of the two spotted spider mite. In these experiments, the test compounds were formulated by dissolving them in an organic solvent, such as acetone, and dispersing the solutions in water containing a small amount of emulsifier such as polyoxyalkylene derivatives of monolaurate and/or monooleate. The above formulation was then applied to plants infested with 50 to 100 adults of the mites and held for five days. Thereafter adult mortality was observed. Some of the results were as follows:

| Test chemical | Concn., percent actual chemical (wt./vol. liquid) | Percent mortality |
|---|---|---|
| Product of Example 2 | 0.35 | 100 |
| Do | 0.10 | 100 |
| Product of Example 6 | 0.35 | 100 |
| Product of Example 8 | 0.35 | 89 |

The products of the present invention can also be used for the control of fungus growth. When the compounds of this invention are used as agricultural fungicides for desirable crops, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew of cucumber, cereal leaf rust on wheat, and such common soil fungi as fusarium wilt (*Fusarium oxysporum*), the seed rot fungus *Phythium deboranum*, and the sheath and culm blight *Rhizoctonia solani*. The new compounds of this invention can also be employed as industrial fungicides to control a variety of fungi which attack such materials as adhesives, cork, paints, lacquers, leather, wood, plastics, and textiles such as cotton or wool. The compositions and techniques described above for the use of these compounds as herbicides can also be used when the compounds are used as fungicides.

The utility of the compounds of this invention as fungicides was illustrated by experiments carried out for the control of fungi. In a typical experiment the compounds to be tested were each dissolved in a suitable solvent, such as acetone, containing a small amount of nonionic surface active agents, such as polyoxyalkylene derivatives of sorbitan monolaurate and/or monoleate. Each mixture was then dispersed in water to form test solutions containing 1000 p.p.m. actual compound.

Fungicidal utility of the compounds of this invention was illustrated by experiments carried out for the control of leaf rust on wheat. In these experiments wheat plants were grown in soil until they were about 2–2½ inches tall. The soil in which the plants were growing was then watered with about 25 cc. of a solution of the chemical in water. The plants were then placed in the greenhouse for about five days and inoculated with leaf rust spores by dusting the spores from diseased plants. After seven to ten days the growth of the fungus on the plants was measured and rated in comparison with plants inoculated but otherwise untreated.

The results of these experiments are presented below:

| Test compound | Concn. actual compound, p.p.m. | Control Percent leaf rust of wheat protectant |
|---|---|---|
| Product of Example 2 | 1,000 | 100 |
| Product of Example 4 | 400 | 91.5 |
| Control | | 0 |

The benzhydrol compounds of this invention are also useful for preparing benzhydrylcarbamates of the following structure:

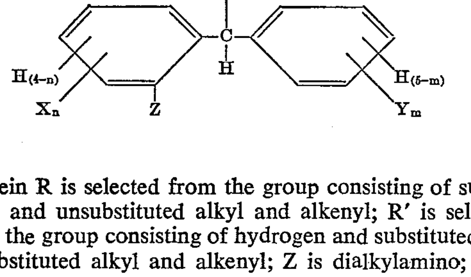

wherein R is selected from the group consisting of substituted and unsubstituted alkyl and alkenyl; R′ is selected from the group consisting of hydrogen and substituted and unsubstituted alkyl and alkenyl; Z is dialkylamino; each X and Y is independently selected from the group consisting of dialkyl amino, alkyl, alkenyl, halogen, nitro, alkoxy and alkylthio; *n* is an integer from 0 to 2; and *m* is an integer from 0 to 3.

These compounds are effective as acaricides. Exemplary of these compounds are:

N-methyl-2-dimethylaminobenzhydrylcarbamate,
N-allyl-2-dimethylaminobenzhydrylcarbamate,
N-methoxyethyl-2-dimethylaminobenzhydrylcarbamate,
N-methyl-N-ethyl-2-dimethylaminobenzhydrylcarbamate,
N-beta-chloroethyl-2-dimethylaminobenzhydrylcarbamate,
N-beta-chloroethyl-2-dimethylaminobenzhydrylcarbamate,
N-methyl-2-dimethylamino-5-chlorobenzhydrylcarbamate,
N-methyl-2-dimethylamino-4-chlorobenzhydrylcarbamate,
N-methyl-2-dimethylamino-5-bromobenzhydrylcarbamate,
N-methyl-2,4,4′-tris(dimethylamino)benzhydrylcarbamate,
N-n-propyl-2-di-n-propylamino-4′-bromobenzhydrylcarbamate,
N-beta-chloroethyl-2-diethylamino-5′-bromobenzhydrylcarbamate,
N,N-diallyl-2-dimethylamino-5′-chlorobenzhydrylcarbamate,
N,N-dimethyl-2-di-isopropylamino-5-chloro-4′-methoxybenzhydrylcarbamate,
N-isopropyl-2-di(2-ethylhexyl)amino-3′-chloro-4′-methylbenzhydrylcarbamate,
N-beta,beta-dichloroethyl-2-di-n-propylamino-4,5-dichlorobenzhydrylcarbamate,
N-methyl-2-diethylamino-2′,4-dimethoxybenzhydrylcarbamate,
N-methyl-2-dimethylamino-2′-allylbenzhydrylcarbamate,
N,N-dimethyl-2-diethylamino-2′-methylthiobenzhydrylcarbamate,
N-methyl-2-(N′-methyl-N′-ethylamino)-5-chlorobenzhydrylcarbamate,
N-methyl-2-(N′-methyl-N′-n-propylamino)-5-chlorobenzhydrylcarbamate,
N-methyl-2-(N′-methyl-N′-isopropylamino)-5-chlorobenzhydrylcarbamate, and the like.

These compounds can be prepared readily, for example, by reacting a suitable dialkylaminobenzhydrol of this invention with a suitable isocyanate or carbamoyl halide. The reaction can be conveniently carried out in a suitable solvent such as benzene, ether, dioxane, and the like. An excess of the isocyanate or carbamoyl halide is preferably utilized in this reaction. The reaction mixture is heated, for example at reflux if benzene or dioxane is utilized, for from about 6 to about 24 hours with stirring. A catalyst or base such as triethylamine can also be utilized, particularly when the carbamoyl halide is used as a reactant, and in that case a stoichiometric amount is preferred. The solvent is removed from the reaction mixture and the desired compound recovered by methods common lizing from a suitable solvent.

Among the suitable isocyanates and carbamoyl halides for use in the preparation of the compounds of this invention are: lower alkyl isocyanates, such as: methylisocyanate, ethylisocyanate, n-propylisocyanate, isopropylisocyanate, cyclohexylisocyanate, isobutylisocyanate, tert-butylisocyanate, and the like; alkenyl isocyanates, such as allylisocyanate, and the like; alkoxyalkyl isocyanates, such as methoxymethyl isocyanate, 2-methoxyethylisocyanate, ethoxymethyl isocyanate, and the like; chloroalkyl isocyanates, such as dichloromethylisocyanate, 2-chloroethylisocyanate, 1-chloro-1-methylethylisocyanate, and the like; dialkyl carbamoyl halides, such as dimethylcarbamoyl bromide, diethylcarbamoyl chloride, dimethylcarbamoyl chloride, diisopropylcarbamoyl chloride, dibutylcarbamoyl chloride, dicyclohexylcarbamoyl chloride, dipentylcarbamoyl chloride, and the like; alkenylcarbamoyl halides, such as divinylcarbamoyl chloride, isopropenylcarbamoyl bromide, allyl tert-butylcarbamoyl chloride, allyl chloromethylcarbamoyl chloride, and the like; alkoxy alkyl carbamoyl halides, such as bis(2-ethoxyethyl) carbamoyl chloride, 2-ethoxyethyl ethylcarbamoyl chloride, ethyl-(2-methoxyethyl) carbamoyl chloride, and the like; and chloroalkyl carbamoyl halides, such as 2-chloroethyl carbamoyl fluoride, bis(chloromethyl) carbamoyl chloride, bis(dichloromethyl) carbamoyl chloride, and the like.

The manner in which the benzhydrol compounds of this invention can be used to prepare the corresponding benzhydrylcarbamates is illustrated in the following examples:

EXAMPLE 12

Preparation of N-methyl-2-dimethylamino-5-chlorobenzhydrylcarbamate 2-dimethylamino-5-chlorobenzhydrol (10 g.), methylisocyanate (10 g.), triethylamine (1 ml.) and benzene (150 ml.) were placed in a 250 ml. three-neck, round-bottom flask equipped with a mechanical stirrer, internal thermometer and reflux condenser. The mixture was stirred and heated at reflux for about 17 hours. The benzene was removed from the reaction mixture by warming the mixture under reduced pressure. The residue was triturated with pentane and allowed to solidify to a solid having a melting point of 86–90° C. The solid was recrystallized from hexane to yield the desired N-methyl-2-dimethylamino-5-chlorobenzhydrylcarbamate as a solid melting 90–92° C. and having the following elemental analysis as calculated for $C_{17}H_{19}ClN_2O_2$ (percent): Theoretical C, 64.04; H, 6.01; N, 8.79. Found (percent): C, 64.37; H, 6.33; N, 8.63.

EXAMPLE 13

Preparation of N-methyl-2-dimethylamino-2′-methyl-5-chlorobenzhydrylcarbamate 2-dimethylamino-2′-methyl - 5 - chlorobenzhydrol (2.3 grams), methylisocyanate (2.0 ml.), dibutyl tin diacetate (1 drop) and benzene (50 ml.) were placed into a 250 ml. glass reaction flask equipped with mechanical stirrer, internal thermometer and reflux condenser. The reaction mixture was refluxed with stirring for a period of about 17 hours. After this time the mixture was heated under reduced pressure to remove the benzene. The residue was held under 0.05 mm. of Hg pressure for a period of about 1 hour to yield N-methyl-2-dimethylamino-2′-methyl-5-chlorobenzhydrylcarbamate as a pale yellow liquid having the following elemental analysis:

*Analysis.*—Theoretical for $C_{18}H_{21}ClN_2O_2$ (percent): C, 64.95; H, 6.36; N, 8.42. Found (percent): C, 66.02; H, 7.56; N, 9.09.

EXAMPLE 14

Preparation of N-methyl-2-dimethylamino-4′-methyl-5-chlorobenzhydrylcarbamate 2-dimethylamino-4′-methyl - 5 - chlorobenzhydrol (2.0 grams), methyl isocyanate (3.0 ml.), dibutyl tin diacetate (1 drop) and ether (50 ml.) were placed in a 100 ml. glass reaction flask. The reaction mixture was allowed to stand at room temperature for a period of about three days. After this time the ether was removed under reduced pressure at 60° C. The residue was held for about one hour at 0.02 mm. of Hg pressure and 60° C. to yield N-methyl-2-dimethylamino - 4′ - methyl - 5 - chlorobenzhydrylcarbamate as the product having a melting point of 83.5 to 86° C. and having the following elemental analysis:

*Analysis.*—Theoretical for $C_{18}H_{21}ClN_2O_2$ (percent): C, 64.95; H, 6.36; Cl, 10.65. Found (percent): C, 64.34; H, 6.37; Cl, 11.13.

EXAMPLE 15

Preparation of N - methyl-2-dimethylamino-4′,5-dichlorobenzhydrylcarbamate 2-dimethylamino-4′,5-dichlorobenzhydrol (2.0 grams), methyl isocyanate (2.0 ml.), dibutyl tin diacetate (1 drop) and ether (500 ml.) was placed in a glass reaction flask. The reaction mixture was allowed to stand at room temperature for about 3 days. After this time the ether was removed under reduced pressure in a rotary evaporator. The residue was triturated with pentane yielding a white solid. The solid was recrystallized from ethanol to yield N-methyl-2-dimethylamino - 4′,5 - dichlorobenzhydrylcarbamate having a melting point of 94 to 97° C. and having the following elemental analysis:

*Analysis.*—Theoretical for $C_{17}H_{18}Cl_2N_2O_2$ (percent): C, 57.80; H, 5.14; N, 7.93. Found (percent): C, 58.17; H, 5.28; N, 7.92.

The utility of the benzhydrylcarbamates as acaricides was shown in experiments for the control of the two spotted spider mite. In these experiments, the test compounds were formulated by dissolving them in an organic solvent, such as acetone, and dispersing the solutions in water containing a small amount of emulsifier. The formulation was then applied to plants infested with 50 to 100 adults of the mites and held for five days. Thereafter adult mortality was observed. Some of the results were as follows:

| Test chemical | Concn., percent actual chemical (wt./vol. liquid) | Percent mortality |
|---|---|---|
| Product of Example 12 | 0.35 | 100 |
| Do | 0.10 | 100 |
| Do | 0.04 | 100 |
| Do | 0.01 | 100 |
| Do | 0.004 | 91 |
| Product of Example 13 | 0.35 | 100 |
| Do | 0.10 | 100 |
| Do | 0.01 | 100 |
| Do | 0.001 | 100 |
| Product of Example 14 | 0.35 | 100 |
| Do | 0.10 | 100 |
| Do | 0.01 | 100 |
| Do | 0.001 | 86 |
| Product of Example 15 | 0.35 | 100 |
| Do | 0.10 | 100 |
| Do | 0.01 | 97 |
| Do | 0.001 | 73 |
| Control | | 0 |

We claim:

1. A compound of the formula:

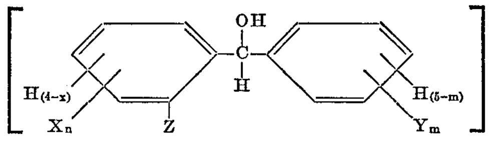

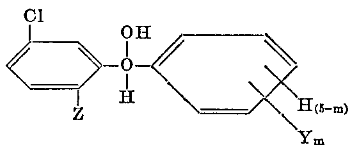

wherein Z is dimethylamino; Y is selected from the group consisting of methyl and chloro; and *m* is an integer from 0 to 3.

2. The compound of claim 1 wherein *m* is an integer from 1 to 3.

3. The compound of claim 1 which is 2-dimethylamino-5-chloro-4′-methylbenzhydrol.

4. The compound of claim 1 which is 2-dimethylamino-5-chloro-2′-methylbenzhydrol.

5. The compound of claim 1 which is 2-dimethylamino-4',5-dichlorobenzhydrol.

6. The compound of claim 1 which is 2-dimethylamino-3',5-dichlorobenzhydrol.

7. The compound of claim 1 which is 2-dimethylamino-5-chlorobenzhydrol.

References Cited

UNITED STATES PATENTS

| | | | |
|---|---|---|---|
| 1,787,064 | 12/1930 | Calcott et al. | |
| 3,414,562 | 12/1968 | Archer et al. ------ | 260—570 X |

OTHER REFERENCES

Mihailescu et al., Chemical Abstracts, vol. 24, p. 2116 (1930).

Testa et al., Chemical Abstracts, vol. 60, pp. 6847–9 (1960).

ROBERT V. HINES, Primary Examiner

U.S. Cl. X.R.

71—106, 121; 260—482, 591; 424—300, 330

UNITED STATES PATENT OFFICE
CERTIFICATE OF CORRECTION

Patent No. 3,510,517 Dated May 5, 1970

Inventor(s) Sidney B. Richter and David P. Mayer

It is certified that error appears in the above-identified patent and that said Letters Patent are hereby corrected as shown below:

Col. 10, line 56, after "common" insert --to the art such as by boiling with charcoal and recrystal- --

Claim 1, that part of the structure enclosed in brackets should be deleted.

SIGNED AND SEALED
OCT 20 1970

(SEAL)
Attest:

Edward M. Fletcher, Jr.
Attesting Officer

WILLIAM E. SCHUYLER, JR.
Commissioner of Patents